United States Patent [19]

Tamashiro et al.

[11] Patent Number: 4,905,731
[45] Date of Patent: Mar. 6, 1990

[54] BRAKE BLEEDER WRENCH

[76] Inventors: Kenneth K. Tamashiro, 1733B 10th Ave., Honolulu, Hi. 96816; George Spector, 233 Broadway Suite 3815, New York, N.Y. 10007

[21] Appl. No.: 378,241

[22] Filed: Jul. 10, 1989

[51] Int. Cl.[4] .................. F16K 37/00; B60T 17/22; F01M 11/04
[52] U.S. Cl. ................... 137/559; 188/352; 116/276; 141/98; 81/52; 7/100; 7/138; 7/164
[58] Field of Search ............ 137/559; 7/100, 138, 7/164; 81/52, 177.85; 116/276; 188/352; 141/98

[56] References Cited

U.S. PATENT DOCUMENTS

| | | | |
|---|---|---|---|
| 2,069,606 | 2/1937 | Gary et al. | 188/352 |
| 2,477,864 | 8/1949 | D'Elosua | 188/352 X |
| 2,611,387 | 9/1952 | Legerski | 188/352 X |
| 2,644,548 | 7/1953 | Schiemann | 188/352 |
| 2,771,093 | 11/1956 | Wilson | 188/352 X |
| 3,301,282 | 1/1967 | Fresolone, Jr. | 188/352 X |
| 3,635,262 | 1/1972 | Stebbins | 141/98 |
| 3,677,513 | 7/1972 | Truelove | 188/352 X |
| 3,809,359 | 5/1974 | Truelove, Sr. | 188/352 X |
| 4,592,448 | 6/1986 | Morris | 141/98 X |
| 4,685,164 | 8/1987 | Sebalos | 7/138 |

Primary Examiner—John Rivell

[57] ABSTRACT

A brake bleeder wrench is provided with a transparent bleeder tube having a magnifying lens along upper portion thereof to improve visibility of air bubbles leaving the bleeder valve when the wrench opens the bleeder valve. In a modified form the head of the wrench contains an interchangeable drive hex socket to compensate for different types of bleeder valves.

3 Claims, 1 Drawing Sheet

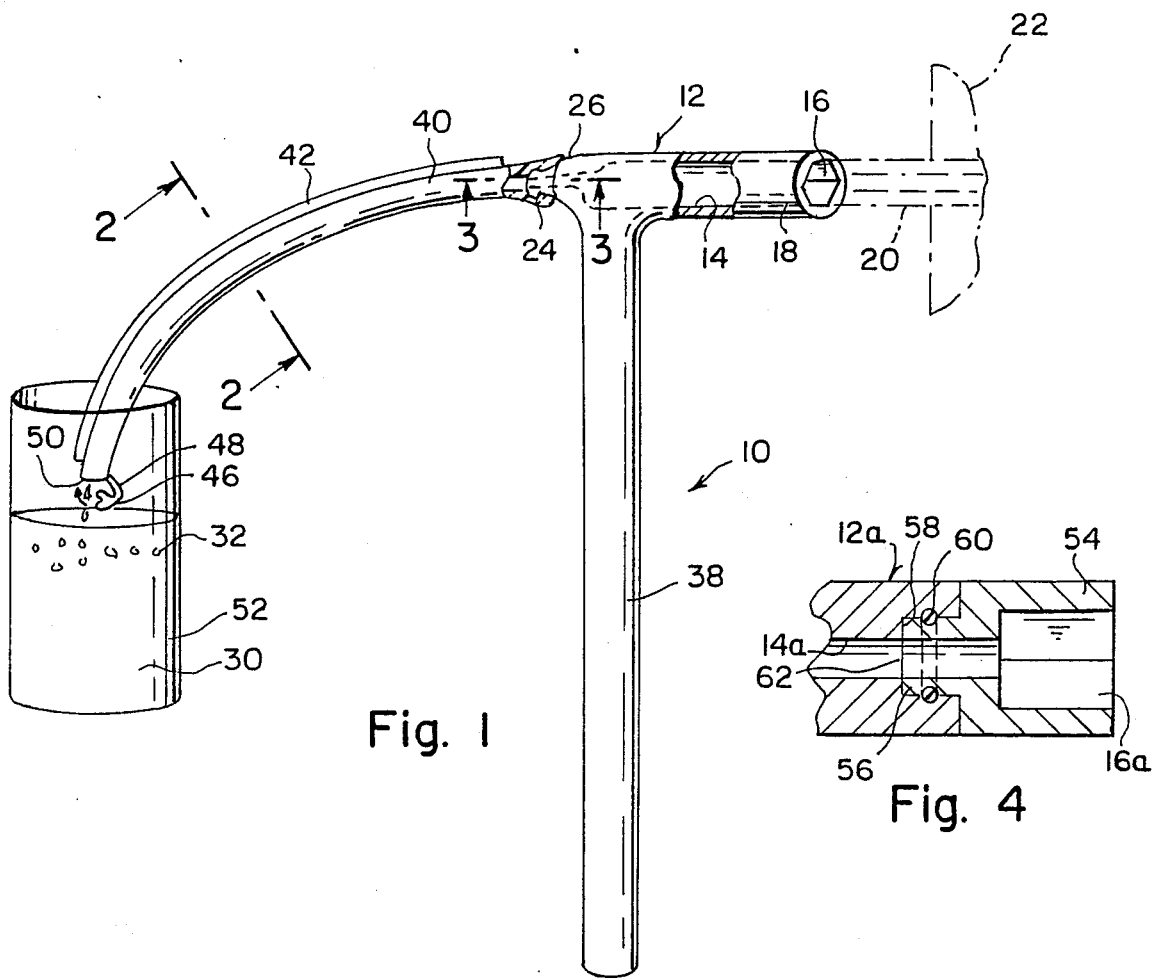
Fig. 1
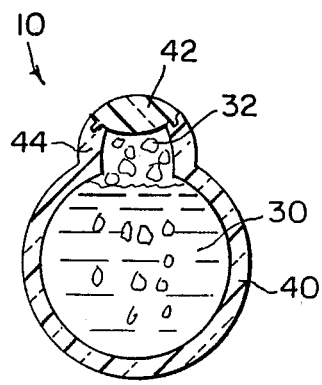
Fig. 2
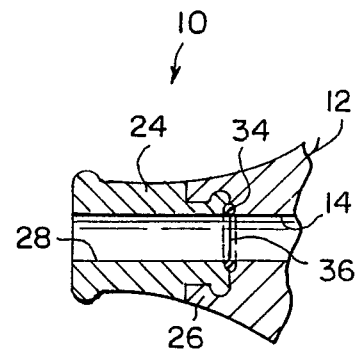
Fig. 3
Fig. 4

BRAKE BLEEDER WRENCH

BACKGROUND OF THE INVENTION

The instant invention relates generally to hydraulic automotive brake systems and more specifically it relates to a brake bleeder wrench.

Numerous hydraulic automotive brake systems have been provided in prior art that are adapted to include bleeder valves which can be operated to remove air from the brake systems. For example, U.S. Pat. Nos. 2,477,864; 2,611,387 and 2,771,093 all are illustrative of such prior art. While these units may be suitable for the particular purpose to which they address, they would not be as suitable for the purposes of the present invention as heretofore described.

SUMMARY OF THE INVENTION

A primary object of the present invention is to provide a brake bleeder wrench that will overcome the shortcomings of the prior art devices.

Another object is to provide a brake bleeder wrench with a transparent bleeder tube having a magnifying lens along upper portion thereof to improve visibility of air bubbles leaving the bleeder valve when the wrench opens the bleeder valve.

An additional object is to provide a brake bleeder wrench that contains a head with interchangeable drive hex sockets to compensate for different types of bleeder valves.

A further object is to provide a brake bleeder wrench that is simple and easy to use.

A still further object is to provide a brake bleeder wrench that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the invention with parts broken away showing a bleeder tube made of transparent material for viewing air bubbles.

FIG. 2 is an enlarged cross sectional view taken along line 2—2 in FIG. 1, showing an upper chamber having a magnifying lens along the upper chamber to improve visibility of the air bubbles.

FIG. 3 is an enlarged cross sectional view taken along line 3—3 in FIG. 1, showing the rotatable end in greater detail.

FIG. 4 is a cross sectional view taken through a modified head with interchangeable drive hex socket for different types of bleeder valves.

DETAILED DESCRIPTION OF THE PREFERRED EMBODIMENTS

Turning now descriptively to the drawings, in which similar reference characters denote similar elements throughout the several views, FIG. 1 illustrates a brake bleeder wrench 10 that contains a head 12 having a bore 14 therethrough with a drive hex socket 16 at one end 18 to detachably receive a bleeder valve 20 from a hydraulic automotive brake system 22 shown in phantom. A beaded end portion 24 as best seen in FIG. 3, is rotatably connected to opposite end 26 of the head 12. The beaded end portion 24 has a bore 28 therethrough fluidly connected with the bore 14 of the head 12 for discharging brake fluid 30 and air bubbles 32 therefrom. An O-ring 34 is disposed between the head 12 and the beaded end portion 24 for sealing the bore connection 36 therebetween. A handle 38 is rigidly connected transversely to the bore 14 of the head 12 so as to turn the head 12 to open and close the bleeder valve 20. A transparent bleeder tube 40 is connected to the beaded end portion 24. The tube, as best seen in FIG. 2, has a magnifying lens 42 along upper chamber portion 4 thereof so as to improve visibility for viewing the air bubbles 32 discharging from the beaded end portion 24 when the drive hex socket 16 of the head turns to open the bleeder valve 20 while the beaded end portion 24 is held in a relative stationary position thereto.

A cap 46 is hingably connected at 48 to free discharge end 50 of the transparent bleeder tube 40 so that when the cap 46 is closed upon the free discharge end 50 the brake fluid 30 will not drip out therefrom. A container 52 can be provided so that the brake fluid 38 and air bubbles 32 can be received therein.

FIG. 3 shows a modified head 12a in which the drive hex socket 16a is a separate and interchangeable member 54 having a male portion 56 which mates with a female receptacle 58 formed about the bore 14a. A ring shaped gasket 60 is carried on the male portion 56 to seal within the female receptacle 58 to prevent leakage out from the bore connection 62 therebetween. Different drive hex socket members 54 can be utilized to compensate for different types of bleeder valves 20.

In operation the wrench 40 is applied to the bleeder valve 20 and then turned to open the bleeder valve to permit the brake fluid 30 and air bubbles 32 to go through the transparent bleeder tube 40 and into the container 52. When the air bubbles 32 are no longer visibly seen through the lens 42 the wrench 10 is then turned in an opposite direction to close the bleeder valve 20 after which the wrench 10 may be removed from the bleeder valve 20.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A brake bleeder wrench which comprises:
   (a) a head having a bore therethrough with a drive hex socket at one end to detachably receive a bleeder valve from a hydraulic automatic brake system;
   (b) a beaded end portion rotatably connected to opposite end of said head, said beaded end portion having a bore therethrough fluidly connected with the bore of said head for discharging brake fluid and air bubbles therefrom;
   (c) an O-ring disposed between said head and said beaded end portion for sealing the bore connection therebetween;
   (d) a handle rigidly connected transversely to the bore of said head so as to turn said head to open and close the bleeder valve; and (e) a transparent bleeder tube connected to said beaded end portion, said tube having a magnifying lens along upper chamber portion thereof so as to improve visibility for viewing the air bubbles discharging from said beaded end portion when the drive hex socket of said head turns to open the bleeder valve while said beaded end portion is held in a relative stationary position thereto.

2. A brake bleeder wrench as recited in claim 1, further comprising a cap hingably connected to free discharge end of said transparent bleeder tube so that when said cap is closed upon the free discharge end the brake fluid will not drip out therefrom.

3. A brake bleeder wrench as recited in claim 2, wherein said head further comprises:
(a) said drive hex socket being a separate and interchangeable member having a male portion which mates with a female receptacle formed therein about the bore; and
(b) a ring shaped gasket carried on said male portion to seal within said female receptacle to prevent leakage out from the bore connection therebetween, whereby different said drive hex socket members can be utilized to compensate for different types of bleeder valves.

* * * * *